US010489654B1

(12) United States Patent
Olgiati et al.

(10) Patent No.: US 10,489,654 B1
(45) Date of Patent: Nov. 26, 2019

(54) VIDEO ANALYSIS METHOD AND SYSTEM

(71) Applicant: Amazon Technologies, Inc., Seattle, WA (US)

(72) Inventors: Andrea Olgiati, Gilroy, CA (US); Nitin Singhal, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 6 days.

(21) Appl. No.: 15/669,659

(22) Filed: Aug. 4, 2017

(51) Int. Cl.
G06K 9/00 (2006.01)

(52) U.S. Cl.
CPC ...... *G06K 9/00711* (2013.01); *G06K 9/00765* (2013.01); *G06K 2009/00738* (2013.01)

(58) Field of Classification Search
CPC ........... G06K 9/00711; G06K 9/00765; G06K 9/00771; G06K 9/00718; G06K 9/00348; G06K 9/00342; G06K 9/00335; G06K 9/00778; G06K 9/00369; G06K 9/006267; G06K 9/00362; G06K 9/00744; G06K 9/34; G06K 9/4604; G06K 9/6218; G06K 9/627; G06K 9/6278; G06K 9/6293; G06K 2209/21; G06K 2209/27; G06K 9/46; G06K 9/4671; G06K 9/66; G06K 9/628; G06T 7/20; G06T 7/194; G06T 7/12; G06T 7/215; G06T 7/246; G06T 7/254; G06T 2207/30232; G06T 2207/30241; G06T 2207/30196; G06T 2207/10016; G06T 2207/10021; H04N 7/18; H04N 7/181; H04N 7/183; H04N 7/188; H04N 5/77; H04N 21/2187; H04N 21/23116; H04N 21/23418; H04N 21/23412;

(Continued)

(56) References Cited

U.S. PATENT DOCUMENTS

| 6,678,413 | B1* | 1/2004 | Liang | A61B 5/1113 |
| | | | | 348/169 |
| 7,868,912 | B2* | 1/2011 | Venetianer | G06K 9/00369 |
| | | | | 348/143 |

(Continued)

OTHER PUBLICATIONS

Koppula, H.S., et al., "Learning Human Activities and Object Affordances From RGB-D Videos," arXiv:1210.1207v2 [cs.RO], May 6, 2013, 18 pages.

(Continued)

*Primary Examiner* — Jose L Couso
(74) *Attorney, Agent, or Firm* — Davis Wright Tremaine LLP

(57) ABSTRACT

A system processes a video stream to identify an activity performed by a subject. The system examines the video segment for the presence or absence of an object that is correlated with the activity. If the object is found, and if the object is positively correlated with the detected activity, a confidence level associated with detecting the activity is increase. If the object is found, and if it is negatively correlated with the activity, the confidence level is decreased. In other examples, absence of an object may be positively or negatively correlated with the activity. In one embodiment, the system may detect a number of alternative activities, and may use the presence or absence of various objects to determine the most likely activity being performed. In another embodiment, the system may use the presence of various objects to narrow the set of activities that are searched for.

20 Claims, 9 Drawing Sheets

(58) Field of Classification Search
CPC ........ H04N 21/44012; G08B 13/19613; G08B 13/19652; G08B 13/196; G08B 13/19602; G08B 13/19608; G08B 13/1961; G08B 13/19641; G08B 21/0476; G08B 21/0423; G08B 13/19606; G06F 17/3079; G06F 17/30799; G06F 17/30805; G06F 17/30811; G06F 17/30784; G06F 16/7837; G06F 16/7847

See application file for complete search history.

(56) References Cited

U.S. PATENT DOCUMENTS

| | | | | |
|---|---|---|---|---|
| 7,932,923 | B2* | 4/2011 | Lipton | G06K 9/00771 348/143 |
| 8,295,597 | B1* | 10/2012 | Sharma | G06K 9/00342 382/173 |
| 8,564,661 | B2* | 10/2013 | Lipton | G08B 13/19608 348/143 |
| 8,711,217 | B2* | 4/2014 | Venetianer | G06K 9/00771 348/143 |
| 9,378,632 | B2* | 6/2016 | Venetianer | G06F 17/3079 |
| 9,760,792 | B2* | 9/2017 | Kant | G06K 9/4604 |
| 9,830,516 | B1* | 11/2017 | Biswas | G06K 9/00765 |
| 9,892,606 | B2* | 2/2018 | Venetianer | G06K 9/00771 |
| 9,922,271 | B2* | 3/2018 | Kant | G06K 9/6277 |
| 10,192,415 | B2* | 1/2019 | Heitz, III | G08B 13/19656 |
| 10,229,324 | B2* | 3/2019 | Hwangbo | G06K 9/00751 |
| 10,242,267 | B2* | 3/2019 | Fan | G06K 9/00771 |
| 10,249,069 | B1* | 4/2019 | Kerzner | G06K 9/00771 |
| 10,271,017 | B2* | 4/2019 | Tu | H04N 7/181 |
| 2004/0120581 | A1* | 6/2004 | Ozer | G06K 9/00335 382/224 |
| 2005/0002561 | A1* | 1/2005 | Monachino | G06K 9/6293 382/159 |
| 2006/0018516 | A1* | 1/2006 | Masoud | G06K 9/00342 382/115 |
| 2007/0177792 | A1* | 8/2007 | Ma | G06K 9/00348 382/155 |
| 2012/0179742 | A1* | 7/2012 | Acharya | H04N 7/18 709/202 |
| 2013/0266227 | A1* | 10/2013 | Ding | G06K 9/00335 382/197 |
| 2014/0071287 | A1* | 3/2014 | Tu | H04N 7/181 348/150 |
| 2015/0363644 | A1* | 12/2015 | Wnuk | G06F 16/23 382/103 |
| 2016/0189174 | A1* | 6/2016 | Heath | G06Q 30/0201 705/7.29 |
| 2016/0203699 | A1* | 7/2016 | Mulhern | G06F 19/3418 340/573.1 |
| 2016/0210839 | A1* | 7/2016 | Yadav | G08B 21/0492 |
| 2017/0293805 | A1* | 10/2017 | Kontschieder | G06F 17/30784 |
| 2019/0065862 | A1* | 2/2019 | Silberschatz | G06K 9/00771 |

OTHER PUBLICATIONS

"Outline of Object Recognition," Wikipedia, The Free Encyclopedia, Jul. 4, 2017, <https://en.wikipedia.org/wiki/Outline_of_object_recognition> [retrieved Jul. 24, 2017], 10 pages.

Sung, J., et al., "Human Activity Detection From RGBD Images," Plan, Activity, and Intent Recognition: Paper From the 2011 AAAI Workshop, Aug. 7, 2011, 8 pages.

Sung, J., et al., "Unstructured Human Activity Detection From RGBD Images," 2012 IEEE International Conference on Robotics and Automation (ICRA), Saint Paul, Minnesota, May 14-18, 2012, pp. 842-849.

* cited by examiner

VIDEO ANALYSIS METHOD AND SYSTEM

BACKGROUND

Video cameras and data storage are both becoming very affordable. Cell phone cameras, security cameras, surveillance cameras, dash cameras, and body cameras are commonplace, and therefore there is a corresponding proliferation of video footage being captured. It is often desirable to identify activities performed in the captured video footage, but this can be a costly and difficult problem. Human-based analysis may require many hours of viewing to identify interesting material from the acquired footage. Automated video analysis can be faster and does not require human intervention. However, automated video analysis can be computationally intensive, and it is frequently unable to identify activities performed in a video segment with high reliability.

BRIEF DESCRIPTION OF THE DRAWINGS

Various techniques will be described with reference to the drawings, in which.

DETAILED DESCRIPTION

Figure 1:
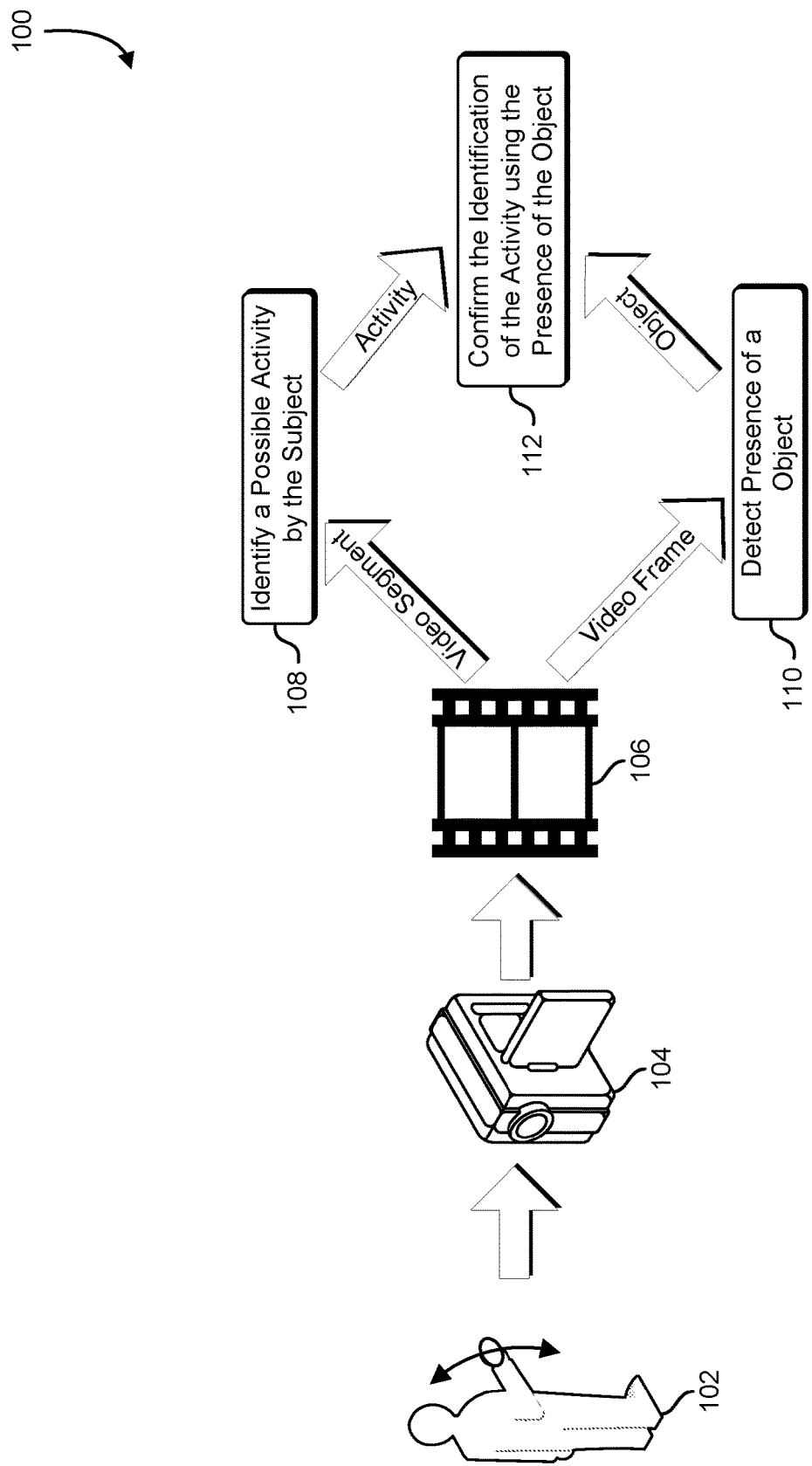
FIG. 1 shows a system in accordance with one embodiment.

The present document describes a system that analyzes and identifies an activity performed by a subject in a video stream by confirming the presence or absence of an object that is correlated with the activity. In one embodiment, a video stream is captured using a video camera or other video capture device. The video stream is provided to a video processing computer system, and the video processing computer system identifies the presence of an activity performed by a subject in a segment of the video stream. In one embodiment, the video processing computer system identifies one or more objects that are correlated with the activity and analyzes the segment of the video stream to determine whether each of the identified objects is present in the video segment. Based at least in part on the presence or absence of each object, the video processing computer system confirms or negates the existence of the activity in the video segment.

In one embodiment, the video processing computer system determines that one of a set of possible activities is being performed in a video segment. The video processing computer system identifies a set of objects that are correlated with a set of possible activities, and determines whether each object in the set of objects is present or absent in the video segment. In one embodiment, the video processing computer system determines that one of the possible activities is present in the video segment based on the presence or absence of a particular object. In one embodiment, the video processing computer system may detect that a subject is performing a sitting motion or a squatting motion, but based on the absence of the chair in the video segment, the video processing system determines that the subject is performing a squatting motion and not a sitting motion. In one embodiment, the video processing computer system may detect that the subject is performing a throwing motion, and based on the presence of a baseball in the video segment, may confirm that the subject is performing a throwing motion. In one embodiment, the video processing computer system may detect that the subject is performing a throwing motion, but may detect the presence of a tennis racket or hammer, and therefore conclude that the subject is not performing a throwing motion.

In one embodiment, the video processing computer system determines a confidence level that an activity is present in a video segment. In one embodiment, the confidence level is determined by an activity identification service. In one embodiment, the activity identification service establishes a degree of conformance between a model for a particular activity and inaction performed in the video segment, and the confidence level is based at least in part on the degree of conformance. In one embodiment, the model identifies a number of components present in the particular activity. When a threshold number of components are detected in the video segment, the activity identification service indicates that the particular activity has been detected. In one embodiment, the confidence level is based at least in part on the fraction of components detected. In one embodiment, the video processing computer system identifies a set of objects that are correlated with the activity. The presence or absence of each object in the set of objects may be positively correlated or negatively correlated with the activity. In one embodiment, the video processing computer system determines whether each of the objects in the set of correlated objects is present or absent in the video segment. In one embodiment, the presence of a particular object in the set of correlated objects is positively correlated with the activity, the particular object is detected in the video segment, and as a result of detecting the particular object, the video processing computer system increases the confidence level associated with the detection of the activity. In one embodiment, the absence of the particular object in the set of correlated objects is positively correlated with the activity, the video processing computer system determines that the object is not present in the video segment, and as a result of detecting that the particular object is not present, the video processing computer system increases the confidence level associated with the detection of the activity. In one embodiment, the presence or absence of a particular object is negatively correlated with the activity, and as a result of detecting that the object is or is not present, the video processing computer system decreases the confidence level associated with the detection of the activity.

In one embodiment, the video processing computer system examines a video segment for the presence of various objects, identifies a set of activities that are positively correlated with one or more of the objects, and then analyzes the video segment for the presence of each of the correlated activities. In one embodiment, the video processing computer system scans a video segment and detects a ball, a chair, and a car. The video processing system then determines that the activities of throwing, sitting, and driving are positively correlated with a ball, a chair, or a car, and proceeds to analyze the video segment for the presence of a subject throwing, sitting, or driving. In one embodiment, by narrowing the number of possible activities, the video processing computer system is able to reduce the processing time associated with activity detection as well as improve detection accuracy.

FIG. 1 shows a system 100 in accordance with one embodiment. In one embodiment, a subject 102 is filmed by a video camera 104 to produce a video stream 106. A video stream may be produced and stored in a variety of formats such as Audio Video Interleave ("AVI"), Flash Video ("FLV"), Windows Media Video ("WMV"), Apple QuickTime Movie ("MOV"), or Moving Pictures Expert Group 4 ("MP4") formats. In one embodiment, the subject 102 is a person, animal, machine, or other object. In one embodiment, the subject 102 performs an activity which is captured on the video stream 106. In one embodiment, the video camera 104 may be a web camera, a cell phone camera, or other video capture device. In one embodiment, the video stream 106 is stored on a storage device in the video camera 104. In an embodiment, the storage device may be a form of random access memory, flash memory, disk memory, or optical storage. In an embodiment, the video stream 106 is stored on a remote storage device outside the video camera 104 such as an external disk storage device, a network storage device, or a network storage service.

In one embodiment, a video processing computer system analyzes the video stream 106 to identify the activity performed by the subject 102. In one embodiment, the video processing computer system acquires a video segment of the video stream 106 and identifies 108 a possible activity being performed by the subject 102. In one embodiment, the subject 102 is a human being and the activity is an action such as throwing, running, driving, waving, or walking. In one embodiment, one or more video frames of the video segment is processed by the video processing computer system, and the video processing computer system detects 110 the presence or absence of an object in the one or more video frames. In one embodiment, the object is determined by the video processing computer system to be correlated with the activity. In one embodiment, the object is determined to be positively correlated with the activity. In one embodiment, the object is determined to be negatively correlated with the activity. In one embodiment, as a result of having detected the presence or absence of the object, the video processing computer system confirms 112 the identification of the activity in the video segment. In one embodiment, the subject 102 is a human subject, the activity is a throwing activity, and the object is a baseball, football, or other commonly thrown object that is positively correlated with throwing.

In one embodiment, the video processing computer system detects a first possible activity by a first subject, and confirms the possible activity by detecting a second activity performed by a second subject. In one embodiment, the first subject is a first person performing a throwing action, and the second subject is a second person performing a catching action.

In one embodiment, the video processing computer system detects a plurality of possible activities performed by the subject 102. After detecting the plurality of possible activities, the video processing computer system identifies a set of objects that are correlated with any of the possible activities, and searches the video stream 106 for the presence or absence of each object in the set of objects. Based at least in part on the presence or absence of various objects, the video processing computer system identifies the most likely activity from the plurality of possible activities. In one embodiment, the video processing computer system assigns a confidence level to each possible activity. Based at least in part on the presence or absence of various objects that are correlated to the possible activity, the confidence level associated with the possible activities is adjusted up or down. After producing a final confidence level for each possible activity, the activity with the highest confidence level is determined to be the activity present in the video stream 106. By adjusting a confidence level for each possible activity based at least in part on the presence or absence of various objects correlated to each of the possible activities, the confidence with which a particular activity can be detected may be improved.

In one embodiment, the video processing computer system detects a collection of objects in a video segment by analyzing one or more frames of the video segment. The video processing computer system identifies a collection of activities that are correlated with at least one of the objects in the collection of objects. The video processing computer system then processes the video segment and attempts to identify each activity in the collection of activities. By searching for a smaller number of possible activities, the speed of the activity detection process may be increased.

Figure 2:
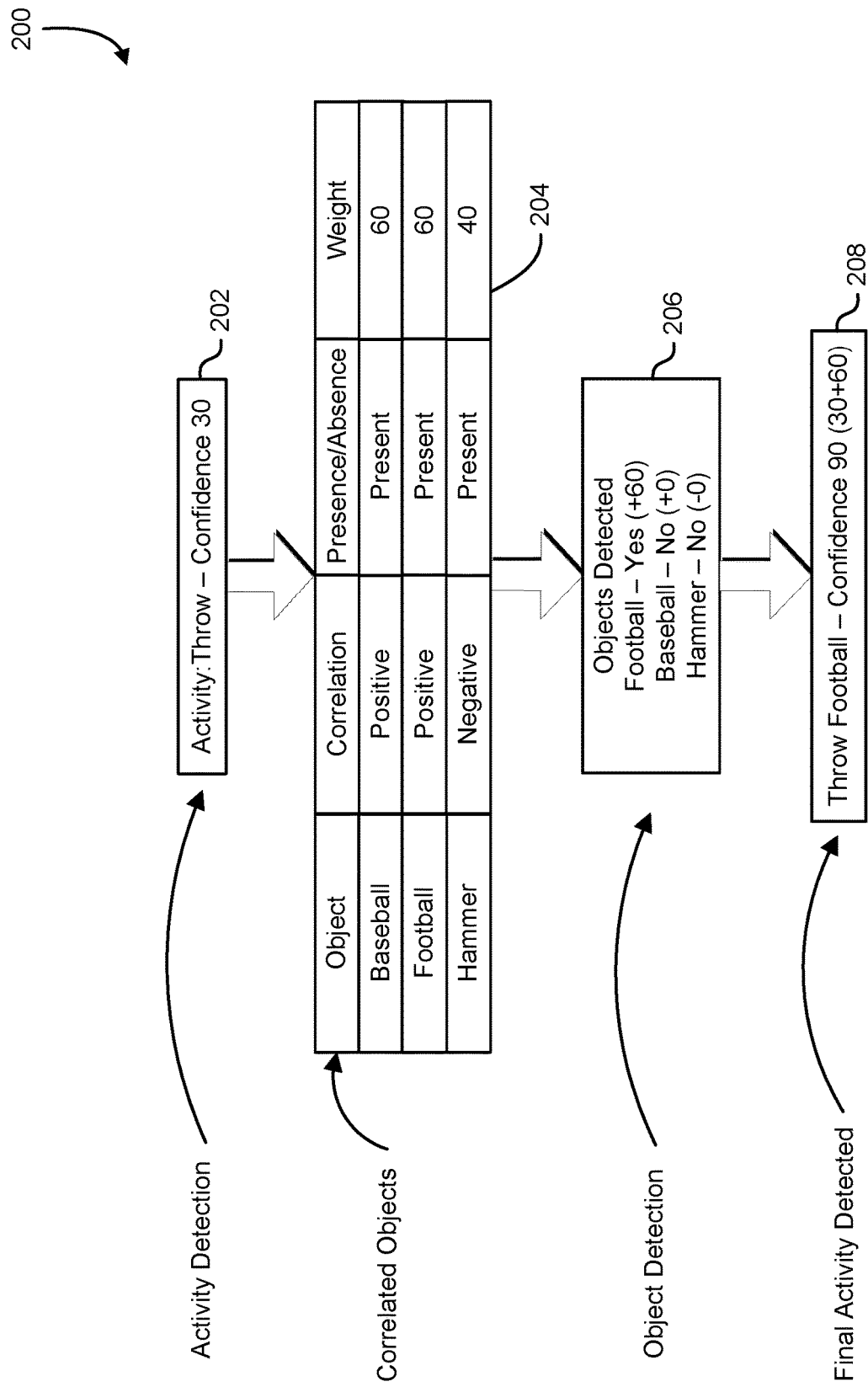
FIG. 2 shows an illustrative example in accordance with one embodiment.

FIG. 2 shows an illustrative example of a data structure 200 that can be used to identify an activity in a video segment in one embodiment. In one embodiment, the data structure is stored in memory on a video processing computer system. In one embodiment, a video processing computer system analyzes a video stream and produces an activity table 202. In one embodiment, the activity table includes a row for each activity detected by the video processing computer system, and each row includes an activity name and a confidence level. In one embodiment, the confidence level is a percentage that indicates the likelihood of the associated activity being present in the video stream. In one embodiment, each row of the activity table 202 represents a particular activity detected in the video stream, and each row of the activity table 202 includes a pointer to a correlated objects table 204.

In one embodiment, the video processing computer system populates the correlated objects table 204 with information related to objects that are correlated with a detected activity. In one embodiment, the correlated objects table 204 includes a row for each correlated object. In one embodiment, each row of the correlated objects table 204 includes a reference to an activity in the activity table 202. In one embodiment, each row of the correlated objects table 204 includes a description of an object. In one embodiment, the description of the object can be a string, globally unique identifier ("GUID"), number, or other identifier. In one embodiment, each row of the correlated objects table 204 includes a correlation field. In one embodiment, the correlation field indicates whether the object is positively correlated or negatively correlated with an associated activity. In one embodiment, a positively correlated object causes a confidence level for associated activity to be increased. In one embodiment, a negatively correlated object causes a confidence level for associated activity to be decreased. In one embodiment, each row of the correlated objects table 204 includes a field that indicates whether the presence or absence of the object is correlated with the associated activity. In one embodiment, the presence of a correlated object causes the confidence level for an associated activity to be increased or decreased. In one embodiment, the absence of a correlated object causes the confidence level for associated activity to be increased or decreased.

In one embodiment, the video processing system determines whether each object represented in the correlated objects table 204 is present or absent, in accordance with the correlation of each object, and adjusts a confidence level for each activity detected in the video stream accordingly. In one embodiment, a set of confidence adjustments 206 is generated by the video processing system. In one embodiment, a set of confidence adjustments is generated for each activity in the activity table 202. In one embodiment, the video processing system determines a final activity 208 with an associated final confidence level. In one embodiment, the final confidence level is determined by applying the set of confidence adjustments 206 for a particular activity to an initial confidence level associated with the particular activity in the activity table 202.

In one embodiment, the video processing system determines a set of confidence adjustments for each activity in the activity table 202. In one embodiment, the video processing system determines a final confidence level for each activity in the activity table 202 by applying a corresponding set of confidence adjustments to each initial confidence level in the activity table 202. In one embodiment, the final activity detected is determined by selecting the activity having the highest confidence level. In one embodiment, the video processing system determines that multiple activities are present in the video stream by identifying a set of activities whose associated levels of confidence exceed a threshold value.

Figure 3:
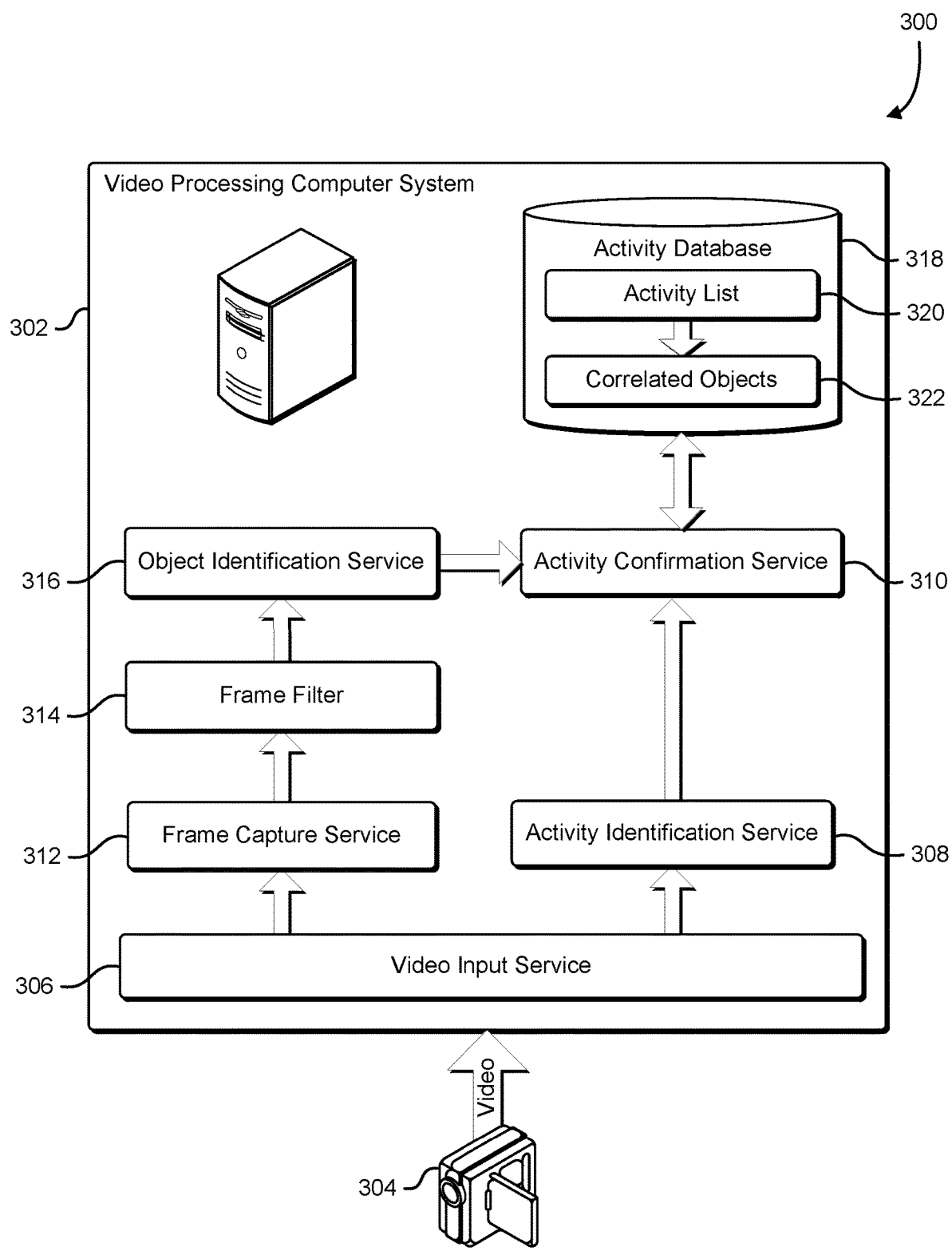
FIG. 3 shows an illustrative example of an activity identifier in accordance with one embodiment.

FIG. 3 shows an illustrative example of a system 300 that identifies activities in a video stream in accordance with one embodiment. In one embodiment, a video processing computer system 302 receives a video stream from a video camera 304. In one embodiment, the video camera 304 may be a camera in a cell phone, a web camera in a laptop or tablet computer, a digital video camera, or other video capture device that is connected to the video processing computer system using a wired or wireless connection. In one embodiment, the video camera 304 is connected to the video processing computer system 302 using a network connection. In one embodiment, the video camera 304 is connected to the video processing computer system 302 using removable storage media that is removed from the video camera 304 and inserted into an interface connected to the video processing computer system 302. In one embodiment, the video processing computer system 302 is a computer server, virtual computer system, computing appliance, network appliance, or service configured to process a video stream and identify activities captured in a video stream. In one embodiment, the video processing computer system 302 is integrated into the video camera 304.

In one embodiment, the video processing computer system 302 includes a video input service 306. In one embodiment, the video input service 306 receives a video stream from the video camera 304 and divides the video stream into two parallel video streams. In one embodiment, the video input service 306 includes a hardware data interface such as a USB interface, a FireWire interface, a serial interface, an optical interface, a Bluetooth interface, or Wi-Fi interface. In one embodiment, the video input service 306 includes a communication driver that converts the signals received via the hardware data interface into a video stream. In one embodiment, the video stream may be a data stream in MPEG, WMV, MOV, or other video format. In one embodiment, a first video stream is provided from the video input service 306 to an activity identification service 308 and a frame capture service 312. In one embodiment, the activity identification service 308 is processor and memory containing instructions that, when executed, implement an activity identification service. In one embodiment, the activity identification service 308 may be implemented using an application-specific integrated circuit ("ASIC") or digital signal processor ("DSP") that include digital logic arranged to implement an activity detection algorithm. Various methods of detecting a human activity are described in "Learning Human Activities and Object Affordances from RGB-D Videos," Hema S Koppula, Rudhir Gupta, Ashutosh Saxena. International Journal of Robotics Research (IJRR), in press, January 2013 available at http://arxiv.org/pdf/1210.1207v2.pdf, "Unstructured Human Activity Detection from RGBD Images," Jaeyong Sung, Colin Ponce, Bart Selman, Ashutosh Saxena. International Conference on Robotics and Automation (ICRA), 2012 available at http://pr.cs.cornell.edu/papers/unstructured_human_activity_learning.pdf, and "Human Activity Detection from RGBD Images," Jaeyong Sung, Colin Ponce, Bart Selman, Ashutosh Saxena. In AAAI workshop on Pattern, Activity and Intent Recognition (PAIR), 2011 available at http://pr.cs.cornell.edu/papers/human_activity_detection_rgbd_2011.pdf. In one embodiment, the activity identification service 308 identifies one or more activities performed by a subject in the video stream. In one embodiment, the activity identification service 308 identifies a particular segment of the video stream containing an activity. In one embodiment, the activity identification service 308 provides information to an activity confirmation service 310 identifying the one or more activities identified and the particular segment of the video stream containing the one or more activities. In one embodiment, the activity identification service 308 provides information to the frame capture service 312 identifying the video segment containing the action.

In one embodiment, the video input service 306 provides a copy of the video stream to the frame capture service 312. In one embodiment, the frame capture service 312 includes a buffer memory and selection logic that captures selected frames of the video stream is still image files. In one embodiment, the still image files may be in RGB, BMP, GIF, JPEG, or other image formats. In one embodiment, the frame capture service 312 receives information from the activity identification service 308 identifying a particular video segment in the video stream containing an action. In one embodiment, the frame capture service 312 identifies the video frames within the particular video segment, and forwards the video frames to a frame filter 314. In one embodiment, the frame filter 314 is a service running on the video processing computer system 302 that is provided with a copy of the video stream. In one embodiment, the frame filter 314 extracts a subset of the frames provided by the frame capture service 312 for analysis by an object identification service 316. In one embodiment, the object identification service 316 is a software service running on a computer system or computing service. In one embodiment, the object identification service 316 is processor and memory containing instructions that, when executed, implement an object identification service. In one embodiment, the object identification service 316 may be implemented using an application-specific integrated circuit ("ASIC") or digital signal processor ("DSP") that include digital logic arranged to implement an object detection algorithm. Information on how to implement an object identification service may be found at https://en.wikipedia.org/wiki/Outline_of_object_recognition. In one embodiment, object detection is accomplished using appearance-based methods, feature-based methods, genetic algorithms, topic models, or unsupervised learning techniques. In one embodiment, the object identification service 316, in addition to identifying a particular object in a video frame, locates the object within the video frame. In one embodiment, the frame capture service 312 provides position offset information for each frame provided to the frame filter 314. The position offset information allows the object identification service 316 to determine the location of an object with reference to an action determined by the activity identification service 308. In one embodiment, the frame filter 314 selects a representative frame from the frames provided by the frame capture service 312. In one embodiment, a representative frame is selected that meets minimum image quality standards. In one embodiment, a set of representative frames are selected from the segment of video. In one embodiment, the object identification service 316 processes the representative video frames provided by the frame filter 314 and determines whether or not one or more objects is present in each frame. In one embodiment, the object identification service 316 determines that a particular object is present or absent from the video segment by determining that the particular object is present or absent from a quorum of the provided video frames.

In one embodiment, the object identification service 316 identifies an interaction between an object and a subject performing an activity. In one embodiment, the interaction is detected by determining the relative position of the object to the subject performing the action, and the object identification service 316 communicates the relative position to the activity confirmation service 310. In one embodiment, the activity identification service 308 uses the information describing the interaction to detect an activity. In one embodiment, the interaction is detected when the object touches the subject. In one embodiment, the interaction is detected when the object is within a specified proximity of the subject. A proximity may be specified by specifying a range of arcs, and range of distances where the object is located relative to the subject during the time frame the subject performs the activity.

In one embodiment, the activity confirmation service 310 identifies a set of objects that are correlated with an identified activity, and identifies the set of objects to the object identification service 316. In one embodiment, the activity confirmation service 310 is implemented as a set of instructions stored in memory on the video processing computer system 302 that, when executed by a processor in the video processing computer system 302 perform one or more of the processes illustrated in FIGS. 6-8. In one embodiment, the object identification service 316 examines the frames provided by the frame filter 314 for the presence of the particular set of objects identified by the activity confirmation service 310. In one embodiment, the video processing computer system 302 includes an activity database 318. In one embodiment, the activity database 318 includes an activity list 320 that is linked to a set of correlated objects 322. In one embodiment, when the activity confirmation service 310 identifies a particular activity as having occurred in the video stream, the activity confirmation service 310 queries the activity database 318 and locates the particular activity in the activity list 320. In one embodiment, the activity confirmation service 310 follows a link in the activity list 320 to the set of correlated objects 322 to identify the set of objects whose presence or absence is correlated with the particular activity. In one embodiment, the activity confirmation service 310 provides the list of correlated objects to the object identification service 316, and the object identification service 316 indicates to the activity confirmation service 310 whether each object in the list of correlated objects is present or absent in the segment of video in which the particular activity was detected. In one embodiment, the activity database 318 is maintained in accordance with the embodiment shown in FIG. 2.

In one embodiment, the activity confirmation service 310 provides an indication to the video camera 304 that describes the activities detected. In one embodiment, the video camera 304 may display the identified actions to the user through a viewfinder or video display attached to the video camera 304. In one embodiment, the video camera 304 retains a copy of the video stream provided to the video processing computer system 302 and adds tags describing the activities detected in the video stream. In one embodiment, each tag identifies a particular activity and a corresponding location within the video stream. In one embodiment, the activity confirmation service 310 provides signal to a security system indicating the detection of a particular activity.

Figure 4:
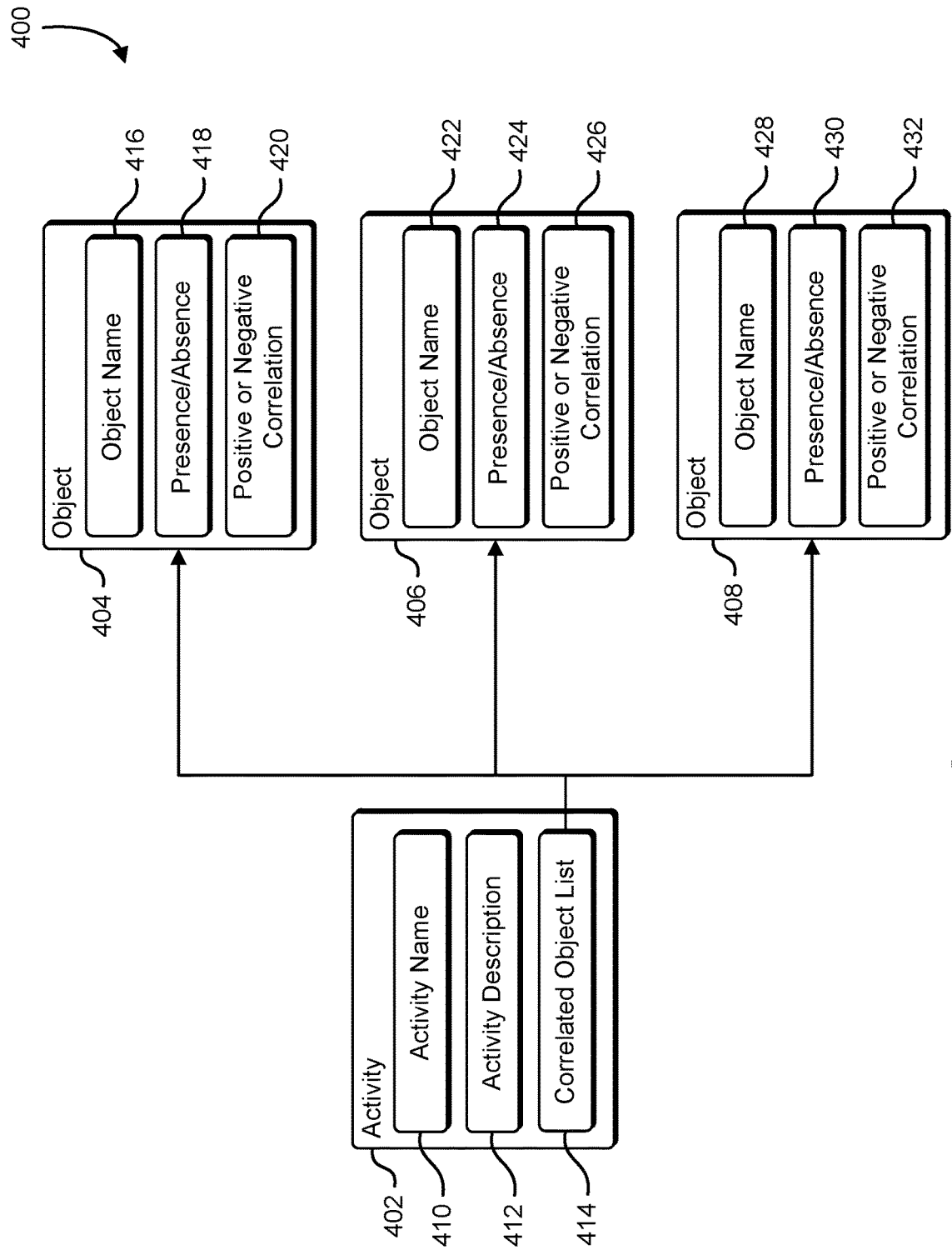
FIG. 4 shows an illustrative example of a data structure for retaining activity and correlated object information in accordance with one embodiment.

FIG. 4 shows an illustrative example of a data structure 400 for retaining activity and object information in accordance with one embodiment. In one embodiment, the data structure may be maintained in memory on a video processing computer system in an activity database. In one embodiment, the data structure shown in FIG. 4 is used to store a database of activities that may be detected and associated objects that are correlated with individual activities. In one embodiment, the video processing computer system uses the information in the data structure to identify objects that may be used to confirm or refute presence of a particular activity. In one embodiment, the video processing system uses the information in the data structure to identify activities that may be present when a particular object is detected.

In one embodiment, an activity record 402 is linked to a number of object records: a first object record 404, a second object record 406, and a third object record 408. In one embodiment, the activity record 402 includes an activity named 410, an activity description 412, and a correlated object list 414. In one embodiment, the activity record 402 is one of a collection of activity records maintained in a linked list, array, database, or other object collection. In one embodiment, the activity named 410 is a digital representation of a human-readable strain that describes the activity represented by the activity record 402. In one embodiment, the activity named 410 is an identifier such as an integer or alphanumeric identifier associated with the activity. In one embodiment, the activity description 412 retains a textual description that describes the activity associated with the activity record 402. In one embodiment, the correlated object list 414 is a collection of pointers, names, record numbers, or other identifiers that identify the number of object records.

In one embodiment, each object record retains information that may be used by an object identification service to determine whether an associated object is present or absent in a video frame. In one embodiment, the first object record 404 includes a first object name 416, a first presence field 418, and a first correlation field 420. In one embodiment, the second object record 406 includes a second object name 422, a second presence field 424, and a second correlation field 426. In one embodiment, the third object record 408 includes a third object name 428, a third presence field 430, and a third correlation field 432. In one embodiment, the first object name 416, the second object name 422, and the third object name 428 retain a name, key field, string, or other identifier associated with the corresponding object record. In one embodiment, the first presence field 418, the second presence field 424, and the third presence field 430 each indicate whether the presence of the corresponding object or the absence of the corresponding object is correlated with the associated activity. In one embodiment, the first correlation field 420, the second correlation field 426, and the third correlation field 432 each indicate whether the correlation of the object and the associated activity is a positive correlation (indicating that the activity is more likely) or negative correlation (indicating that the activity is less likely). In one embodiment, each object record includes a link to the activity record with which it is correlated. In one embodiment, each object record includes object identification parameters that are usable by a video processing computer system to identify the object in a video frame.

Figure 5:
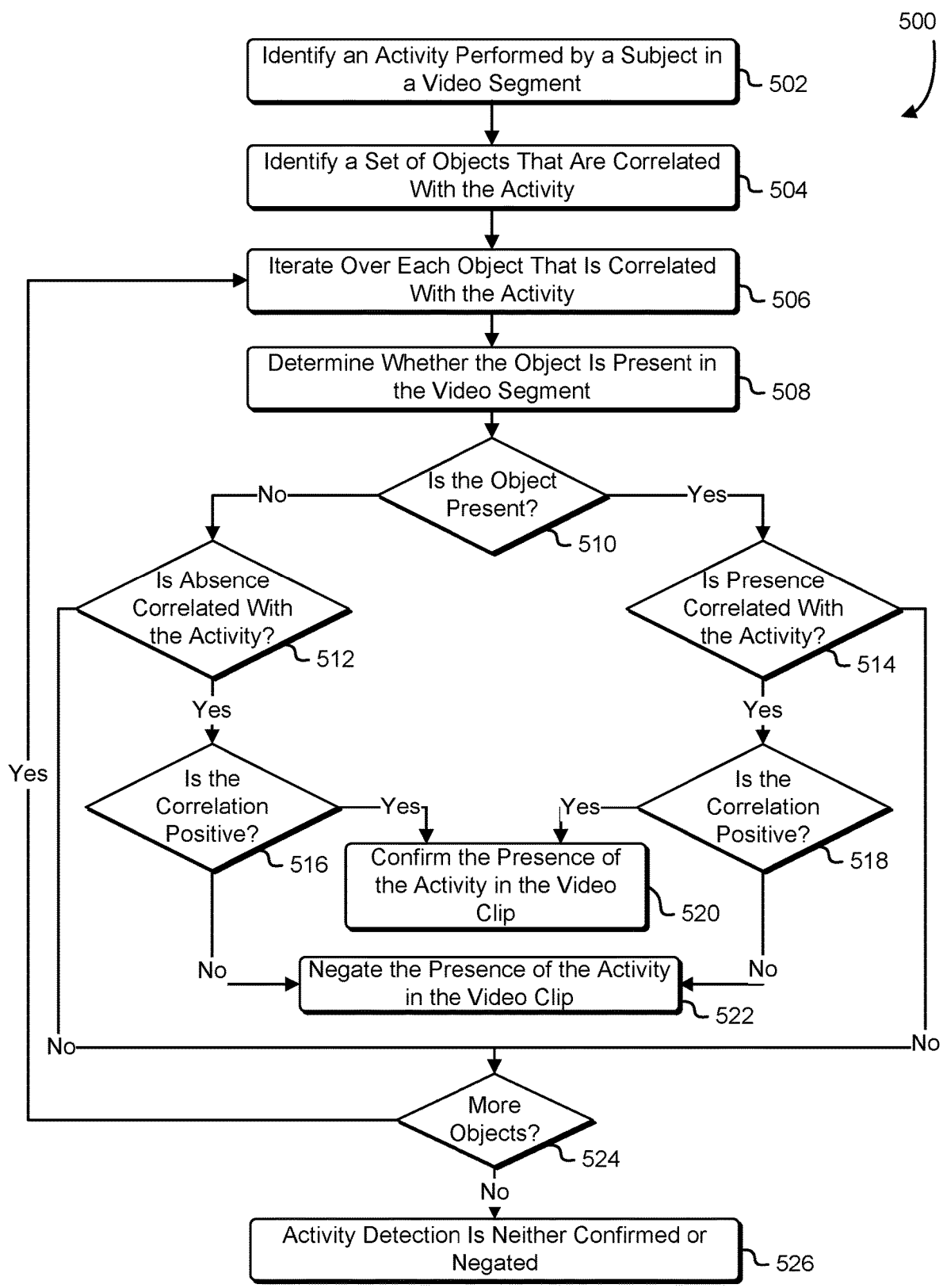
FIG. 5 shows an illustrative example of a process in accordance with one embodiment.

FIG. 5 shows an illustrative example of a process that, as a result of being performed by a video processing computer system, refines activity detection based at least in part on the presence or absence of an object in accordance with one embodiment. In one embodiment, a flowchart 500 illustrates a process that begins a block 502 with a video processing computer system identifying an activity performed by a subject in a video segment. In one embodiment, the video processing computer system is provided with a video stream, and the video processing computer system analyzes the video stream to detect the presence of a number of various actions. In one embodiment, when an action is detected, the video processing computer system identifies the particular action and the segment of the video stream in which the particular action occurs. In one embodiment, at block 504, the video processing computer system identifies a set of objects that are correlated with the identified activity. In one embodiment, the video processing computer system identifies a set of correlated objects by querying a database of detectable activities and correlated objects such as the data structure shown in FIG. 4.

In one embodiment, at block 506, the video processing computer system initiates a loop that iterates over each object that is correlated with the detected activity. In one embodiment, at block 508, the video processing computer system determines whether the iterated object is present or absent in the video segment. In one embodiment, at decision block 510, if the iterated object is not present in the video segment, execution advances to decision block 512. In one embodiment, at decision block 512, the video processing computer system determines whether the presence or absence of the iterated object is correlated with the activity. If the absence of the iterated object is correlated with the activity, execution advances to decision block 516. If absence of the iterated object is not correlated with the activity, execution advances to decision block 524 where the loop is closed.

In one embodiment, if the iterated object is present in the video segment, execution advances to decision block 514. In one embodiment, at decision block 514, the video processing computer system determines whether the presence or absence of the iterated object is correlated with the activity. If the presence of the iterated object is correlated with the activity, execution advances to decision block 518. If the presence of the iterated object is not correlated with the activity execution advances to decision block 524 where the loop is closed.

In one embodiment, at decision blocks 516 and 518, the video processing computer system determines whether the iterated object is positively or negatively correlated with the detected activity (at decision block 516, correlation is with the absence of the iterated object, and at decision block 518, correlation is with the presence of the iterated object). In one embodiment, if the iterated object is positively correlated with the detected activity, execution advances to block 520 and the video processing computer system confirms the presence of the activity in the video segment. In one embodiment, at block 520 the video processing computer system increases the confidence level in the detection of the activity. In one embodiment, if the iterated object is negatively correlated with the detected activity, execution advances to block 522 and the video processing computer system negates the presence of the activity in the video segment. In one embodiment, at block 522, the video processing computer system decreases the confidence level in the detection of the activity. In one embodiment, execution advances from block 522 to decision block 524 where the loop is closed. In one embodiment, the presence or absence of the activity is determined at block 520 or 522, and the process of confirming or denying the presence of a particular activity in a video segment is complete.

In one embodiment, at decision block 524, the video processing computer system determines whether additional correlated objects remain to be processed, and if additional objects remain to be processed, execution returns to block 506 where the next correlated object is processed. If there are not additional correlated objects to be processed, execution advances to block 526. In one embodiment, at block 526, the video processing computer system neither confirms nor negates the presence of the detected activity in the video segment.

Figure 6:
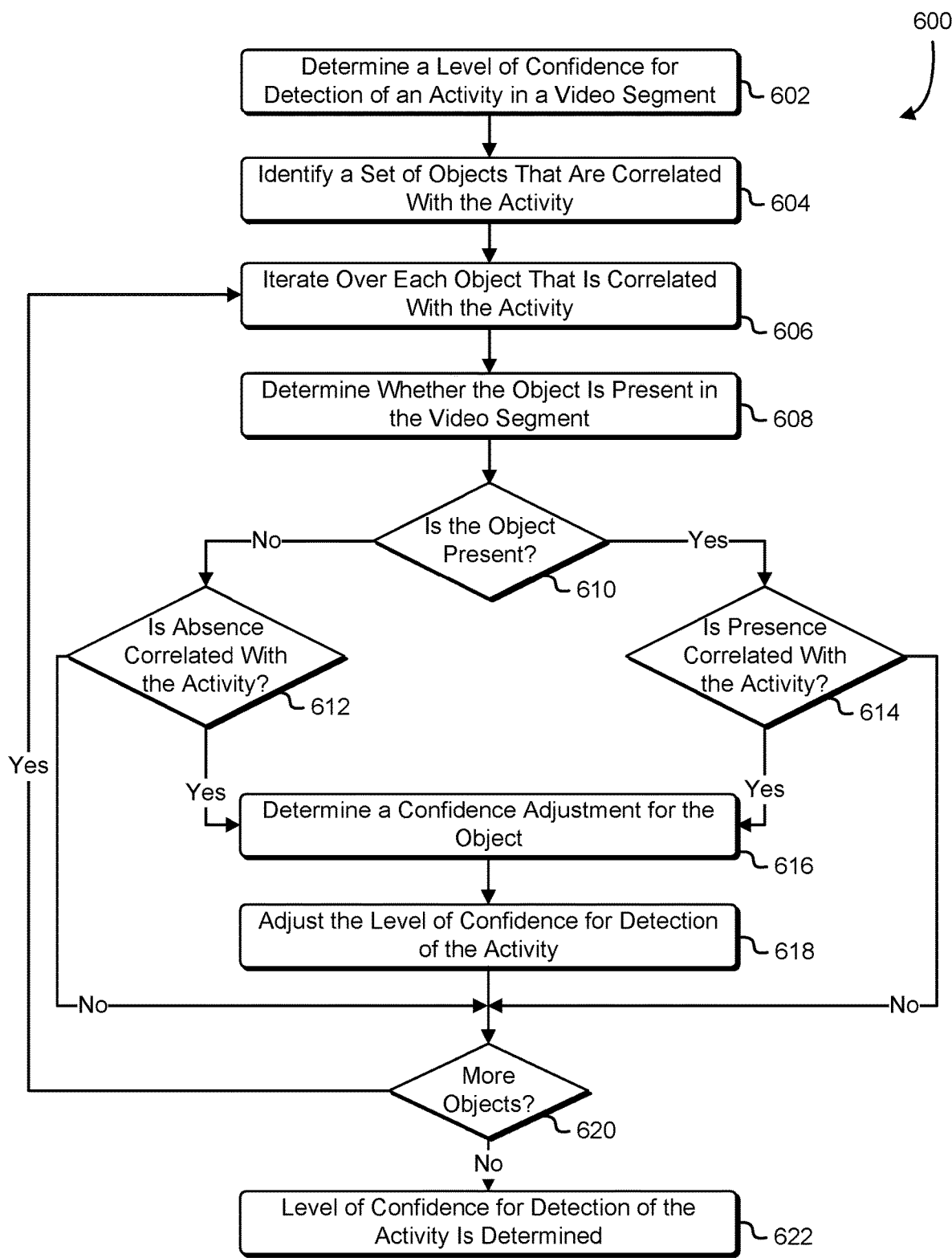
FIG. 6 shows an illustrative example of a process in accordance with one embodiment.

FIG. 6 shows an illustrative example of a process that, as a result of being performed by a video processing computer system, adjusts of confidence level associated with detection of an activity based at least in part on the presence or absence of an object in accordance with one embodiment. In one embodiment, a flowchart 600 illustrates a process that begins a block 602 with a video processing computer system determining a confidence level indicating a likelihood that a particular activity performed by a subject is present in a video segment. In one embodiment, at block 604, the video processing computer system identifies a set of objects that are correlated with the particular activity. In one embodiment, the video processing computer system identifies the set of correlated objects by querying a database of detectable activities and correlated objects such as the data structure shown in FIG. 4.

In one embodiment, at block 606, the video processing computer system initiates a loop that iterates over each object that is correlated with the detected activity. In one embodiment, at block 608, the video processing computer system determines whether the iterated object is present or absent in the video segment. In one embodiment, at decision block 610, if the iterated object is not present in the video segment, execution advances to decision block 612. In one embodiment, at decision block 612, the video processing computer system determines whether the presence or absence of the iterated object is correlated with the activity. If the absence of the iterated object is correlated with the activity, execution advances to block 616. If absence of the iterated object is not correlated with the activity, execution advances to decision block 620 where the loop is closed.

In one embodiment, if the iterated object is present in the video segment, execution advances to decision block 614. In one embodiment, at decision block 614, the video processing computer system determines whether the presence or absence of the iterated object is correlated with the activity. If the presence of the iterated object is correlated with the activity, execution advances to block 616. If the presence of the iterated object is not correlated with the activity execution advances to decision block 620 where the loop is closed.

In one embodiment, at block 616 the video processing computer system determines a confidence adjustment for the detection of the activity based at least in part on the identity of the object. The confidence adjustment may increase or decrease the confidence level for the activity. In one embodiment, the confidence adjustment is an adjustment that is added or subtracted the confidence level. In one embodiment, the confidence adjustment is an adjustment factor that is applied to the current confidence level. In one embodiment, at block 618, the video processing computer system applies the confidence adjustment the current confidence level for the detection of the activity, to produce a final confidence level associated with the detection of the activity.

In one embodiment, at decision block 620, the video processing computer system determines whether additional correlated objects remain to be processed, and if additional objects remain to be processed, execution returns to block 606 where the next correlated object is processed. If there are not additional correlated objects to be processed, execution advances to block 622. In one embodiment, at block 622, the video processing computer system provides the final confidence level to a requester. In one embodiment, the video processing computer system compares the final confidence level to a threshold confidence level and indicates, to a requester, whether the activity is detected or not based on the results of the comparison.

Figure 7:
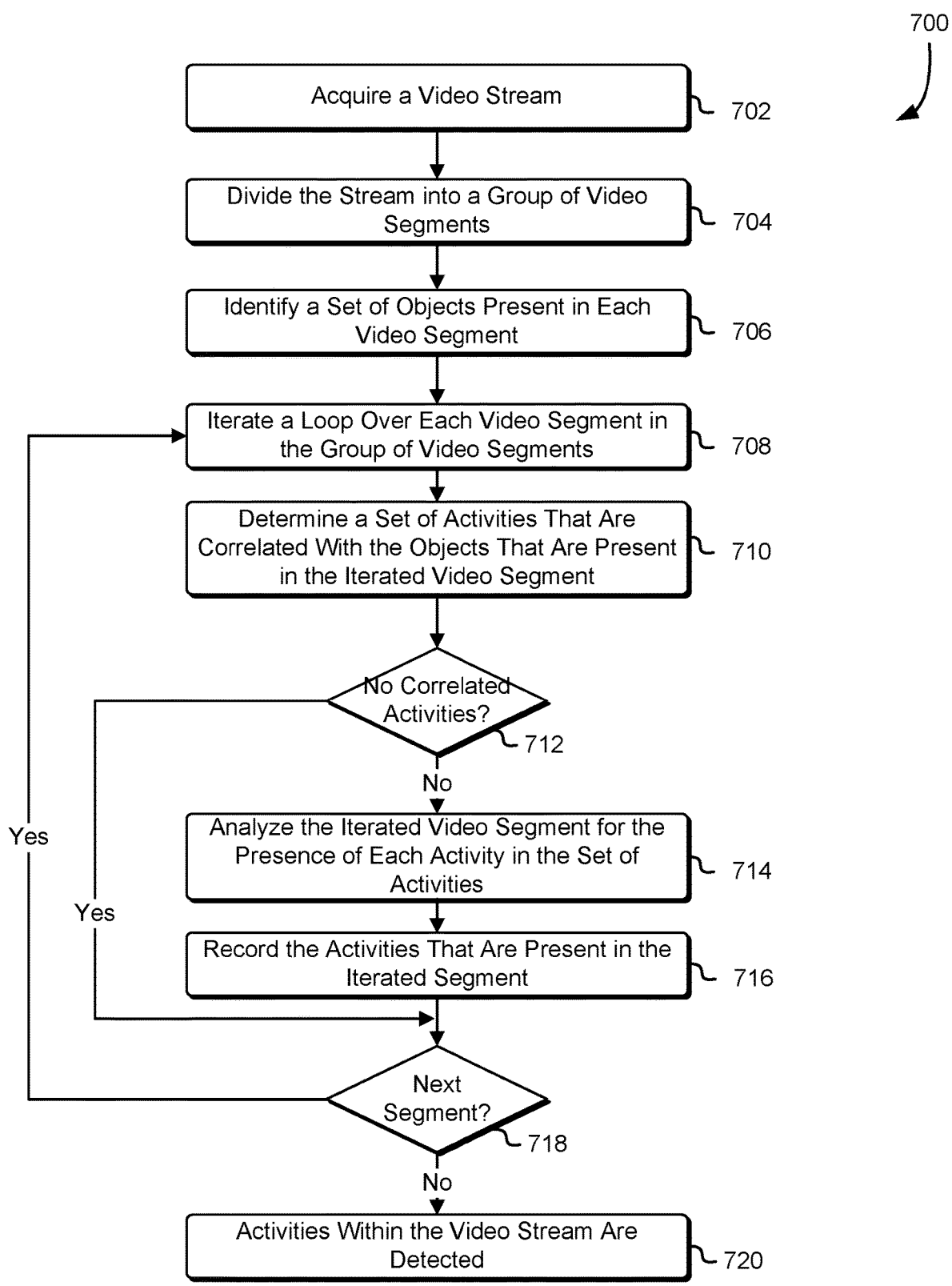
FIG. 7 shows an illustrative example of a process in accordance with one embodiment.

FIG. 7 shows an illustrative example of a process that detects activities in a video stream based at least in part on the presence of one or more objects, in accordance with one embodiment. A flowchart 700 illustrates an embodiment of a process that, as a result of being performed by a video processing computer system, detects activities present in a video stream. In one embodiment, at block 702, the video processing computer system acquires a video stream. In one embodiment, the video stream is provided by camera or other video source. In one embodiment, at block 704 the video processing computer system divides the video stream into a number of video segments. In one embodiment, the video segments are overlapping to allow for the detection of activities that cross segment boundaries. In one embodiment, at block 706, the video processing computer system identifies, for each video segment, a set of objects that are present in the particular video segment.

In one embodiment, at block 708, the video processing computer system initiates a loop that iterates over each video segment in the video stream for which at least one object was identified. In one embodiment, at block 710, the video processing computer system queries an activity database to identify a set of activities that are correlated positively with the presence of the objects identified in the iterated video segment. In one embodiment, at decision block 712, if the video processing computer system determines that there are not any detectable activities that are correlated with the objects in the iterated video segment, execution branches forward to decision block 718. If the video processing computer system determines that there are detectable activities that are correlated with the objects in the iterated video segment, execution advances to block 714. In one embodiment, at block 714 the video processing computer system analyzes the iterated video segment to determine whether any of the determined correlated activities are present. In one embodiment, the video processing computer system is able to limit the search for activities to a smaller set of possible activities, thereby increasing the speed with which a video stream can be searched for the presence of activities. In one embodiment, at block 716, the video processing computer system stores a record of any activities that are detected in the iterated video segment. In one embodiment, the video processing computer system notifies a security monitor, administrative console, or other video processing system that the activity has been detected in the iterated video segment.

In one embodiment, a decision block 718, the video processing computer system determines whether there are more video segments to be processed. If there are more video segments to be processed, execution returns to block 708 and the next video segment having detected objects is processed. If there are no more video segments to be processed, execution advances to block 720. In one embodiment, at block 720, processing of the video stream is complete and the activities within the video stream are detected.

Figure 8:
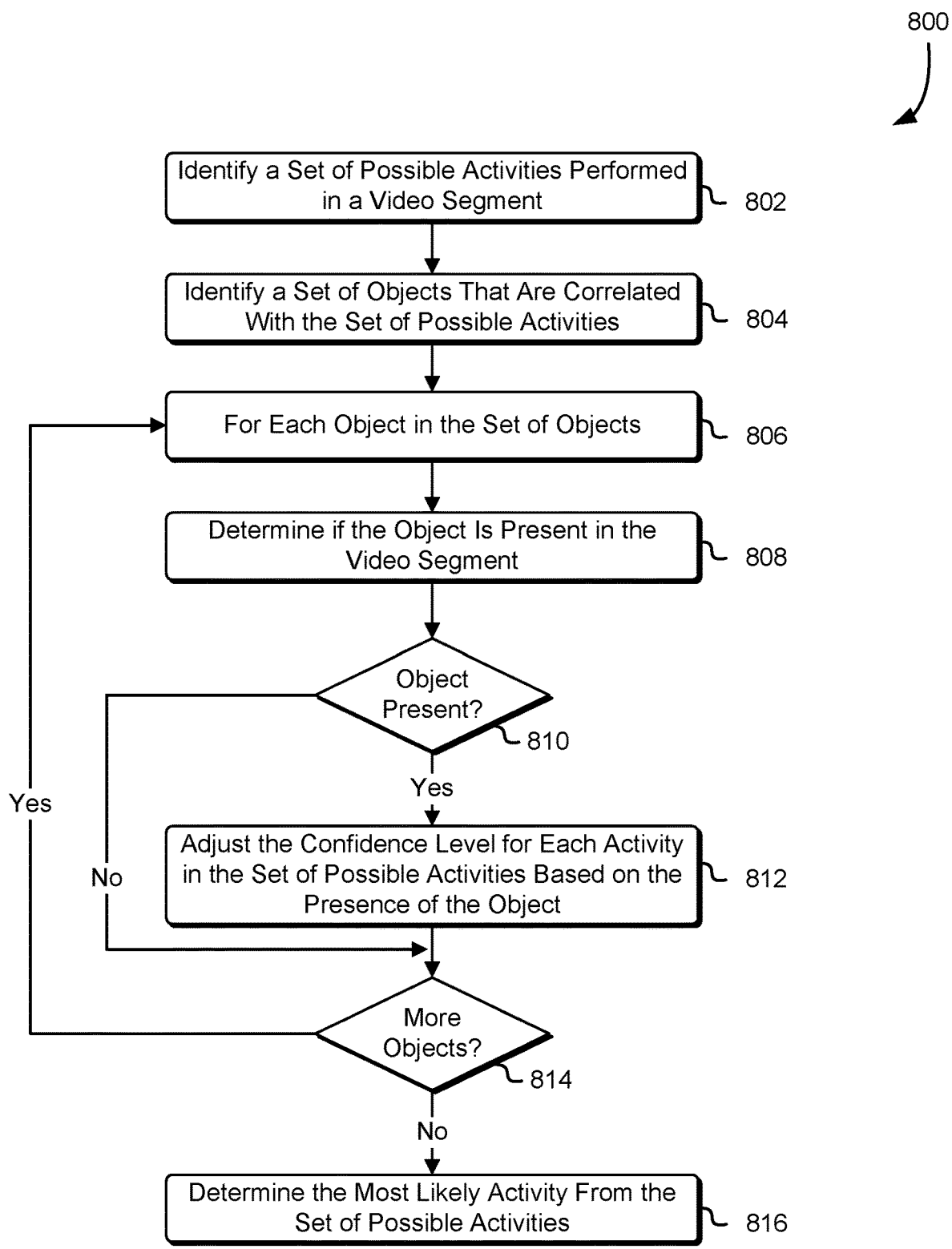
FIG. 8 shows an illustrative example of a process in accordance with one embodiment.

FIG. 8 shows an illustrative example of a process that selects from a set of possible detected activities based on the detection of one or more objects that are correlated with the set of activities, in accordance with one embodiment. A flowchart 800 illustrates one embodiment of a process that, when executed by a video processing computer system, identifies a particular activity from a set of possible activities present in a video segment.

In one embodiment, at block 802, the video processing computer system identifies a set of possible activities that are present in a particular video segment. In one embodiment, the video processing computer system identifies the set of possible activities by searching the video segment for each activity in a set of detectable activities, determining a confidence value associated with each activity in the set of detectable activities, and identifying those activities having a confidence value that exceeds a threshold level. In one embodiment, the video processing computer system identifies a confidence value for each activity in a set of detectable activities, and identifies a fixed number of activities having the highest confidence value from the set of detectable activities. In one embodiment, the video processing computer system determines an initial confidence level for the detection of each activity in the set of possible activities, and stores the initial confidence level for each possible activity in memory. In one embodiment, the initial confidence level is provided by the activity identification service. In one embodiment, the initial confidence level is set to a default level as a result of the activity identification service indicating that the activity has been detected.

In one embodiment, the video processing computer system identifies a hierarchy of related actions that may be present in the video segment. The hierarchy may represent a genus of activates with related species activates that are distinguishable from each other based at least in part on the presence or absence of various objects in the video segment. For example, the hierarchy may represent various jumping activates such as rope jumping, high jumping, long jumping, and ski jumping, where the presence of various objects (skis, ropes, poles, and so on allows the video processing computer system to distinguish between the various jumping activities.

In one embodiment, at block 804, the video processing computer system queries an activity database to identify a set of objects that are correlated with any of the set of possible activities. In one embodiment, the video processing computer system identifies only objects that are positively correlated with any of the set of possible activities. In one embodiment, the video processing computer system identifies only objects that are negatively correlated with any of the set of possible activities. In one embodiment, the activity database is maintained in the video processing computer system at the table of activities where each record in the table represents an activity and is linked to one or more object records. Each object record may include a confidence modifier, and when the object is detected in a video segment in which the associated activity is detected, the confidence value associated with the detected activity is modified in accordance with the confidence modifier. In one embodiment, the activity database is arranged as shown in FIG. 4.

In one embodiment, at block 806, the video processing computer system initiates a loop that iterates over each object in the set of objects. In one embodiment, at block 808, the video processing computer system determines if the iterated object is present in the video segment. At decision block 810, if the iterated object is present in the video segment, execution advances to block 812. At decision block 810, if the iterated object is not present in the video segment, execution advances to decision block 814. In one embodiment, at block 812, the video processing computer system adjusts the stored confidence level for each activity in the set of possible activities based on the presence of the iterated object. In one embodiment, the video processing computer system iterates over each possible activity, determining a confidence adjustment for each iterated activity, and adjusting and storing a modified confidence level for each iterated activity. In one embodiment, at decision block 814, the video processing computer system determines whether there are more objects to be processed. If there are more objects to be processed execution returns to block 806 and the next object in the set of objects is processed. If there are more objects to be processed, execution advances to block 816. In one embodiment, at block 816, the video processing computer system determines whether one or more actions is present in the video segment based at least in part on the determined final confidence level. In one embodiment, the video processing computer system determines that the action performed in the video segment is the action having the highest confidence level. In one embodiment, the video processing computer system determines that the video segment contains any actions having a final confidence level greater than a threshold value. The threshold value may be determined by an administrator as part of configuring the activity detection system. For example, the threshold value may be a confidence level corresponding to the activity being more likely than not present in the video segment.

Figure 9:
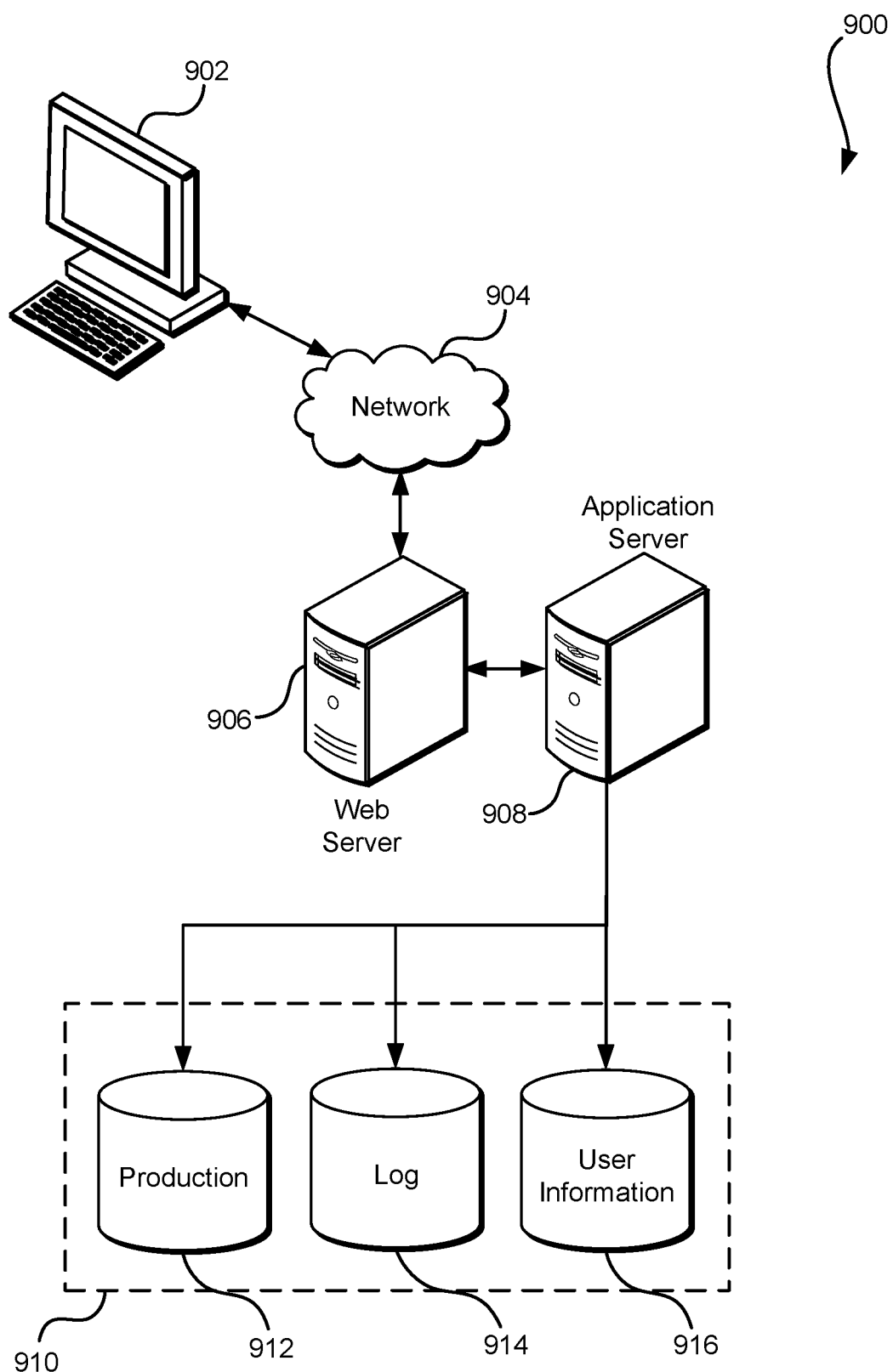
FIG. 9 illustrates a system in which various embodiments can be implemented.

FIG. 9 illustrates a system 900 for implementing aspects in accordance with one embodiment. In one embodiment, a web-based system is used. The system includes an electronic client device 902, which can include any appropriate device operable to send and/or receive requests, messages, or information over an appropriate network 904 and, in one embodiment, convey information back to a user of the device. In one embodiment, client devices include personal computers, cell phones, handheld messaging devices, laptop computers, tablet computers, set-top boxes, personal data assistants, embedded computer systems, electronic book readers, and the like. In one embodiment, the network includes any appropriate network, including an intranet, the Internet, a cellular network, a local area network, a satellite network, or any other such network and/or combination thereof. In one embodiment, components used for such a system can depend at least in part on the type of network and/or system selected. In one embodiment, communication over the network can be enabled by wired or wireless connections and combinations thereof. In one embodiment, the network includes the Internet and/or publicly addressable communications network, as the system includes a web server 906 for receiving requests and serving content in response thereto. In one embodiment, an alternative device serving a similar purpose is used for other networks.

In one embodiment, the illustrative system includes at least one application server 908 and a data store 910. In one embodiment, there are several application servers, layers, or other elements, processes, or components, which may be chained or otherwise configured, which can interact to perform tasks such as obtaining data from an appropriate data store. Servers, as used herein, can be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. In one embodiment, the application server can include any appropriate hardware, software, and firmware that integrates with the data store as needed to execute aspects of one or more applications for the client device, handling some or all of the data access and business logic for an application. In one embodiment, the application server provides access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. In one embodiment, content transferred to a client device is processed by the client device to provide the content in one or more forms including, but not limited to, forms that are perceptible to the user audibly, visually, and/or through other senses. In one embodiment, the handling of requests and responses, and the delivery of content between the client device 902 and the application server 908, is handled by the web server using PHP: Hypertext Preprocessor ("PHP"), Python, Ruby, Perl, Java, HTML, XML, JSON, and/or another appropriate server-side structured language. Further, operations described herein as being performed by a single device may, unless otherwise clear from context, be performed collectively by multiple devices, which may form a distributed and/or virtual system.

In one embodiment, the data store 910 includes several separate data tables, databases, data documents, dynamic data storage schemes, and/or other data storage mechanisms and media for storing data relating to a particular aspect of the present disclosure. In one embodiment, the data store illustrated includes mechanisms for storing production data 912 and user information 916, which can be used to serve content for the production side. In one embodiment, the data store is shown to include a mechanism for storing log data 914, which can be used for reporting, analysis, or other such purposes. In one embodiment, other aspects may be stored in the data store, such as page image information and access rights information, which can be stored in any of the above listed mechanisms as appropriate or in additional mechanisms in the data store 910. In one embodiment, the data store 910 is operable, through logic associated therewith, to receive instructions from the application server 908 and obtain, update or otherwise process data in response thereto. In one embodiment, the application server 908 provides static, dynamic, or a combination of static and dynamic data in response to the received instructions. In one embodiment, dynamic data, such as data used in web logs (blogs), shopping applications, news services, and other such applications is generated by server-side structured languages as described herein or may be provided by a content management system ("CMS") operating on, or under the control of, the application server. In one embodiment, a user, through a device operated by the user, submits a search request for a certain type of item, and the data store accesses the user information to verify the identity of the user and can access the catalog detail information to obtain information about items of that type, and then the information is returned to the user. In one embodiment, the information is returned as a results listing on a web page that the user is able to view via a browser on the client device 902. In one embodiment, information for a particular item of interest is viewed in a dedicated page or window of the browser. The present disclosure is not limited to the context of web pages, and may be applicable to processing requests in general where the requests are not requests for content.

In one embodiment, a server includes an operating system that provides executable program instructions for the general administration and operation of that server and further includes a computer-readable storage medium (e.g., a hard disk, random access memory, read only memory, etc.) storing instructions that, when executed (i.e., as a result of being executed) by a processor of the server, allow the server to perform its intended functions.

The system, in one embodiment, is a distributed and/or virtual computing system utilizing several computer systems and components that are interconnected via communication links, using one or more computer networks or direct connections. In one embodiment, such a system could have a fewer or a greater number of components than are illustrated in FIG. 9. Thus, the depiction of the system 900 in FIG. 9 should be taken as being illustrative in nature and not limiting to the scope of the disclosure.

An embodiment can be implemented in a wide variety of systems, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. An embodiment can also include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

An embodiment can utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In one embodiment, connection-oriented protocols may be used to communicate between network endpoints. Connection-oriented protocols (sometimes called connection-based protocols) are capable of transmitting data in an ordered stream. Connection-oriented protocols can be reliable or unreliable. In one embodiment, the protocol is a reliable connection-oriented protocol such as TCP. In one embodiment, the protocol is an unreliable connection-oriented protocol such as Asynchronous Transfer Mode ("ATM") or Frame Relay. Connection-oriented protocols are in contrast to packet-oriented protocols such as UDP that transmit packets without a guaranteed ordering.

In one embodiment that utilizes a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. In one embodiment, the server(s) are capable of executing programs or scripts in response to requests from user devices, such as by executing one or more web applications that may be implemented as one or more scripts or programs written in any programming language, such as Java®, C, C#, or C++, or any scripting language, such as Ruby, personal home page ("PHP"), Perl, Python, or test control language ("TCL"), as well as combinations thereof. In one embodiment, the server(s) include one or more database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The system can include a variety of data stores and other memory and storage media as discussed above. In one embodiment, these reside in a variety of locations, such as on a storage medium local to (and/or resident in) one or more of the computers or remote from any or all of the computers across the network. In one embodiment, the information may reside in a storage-area network ("SAN") familiar to those skilled in the art. In one embodiment, files for performing the functions attributed to the computers, servers, or other network devices may be stored locally and/or remotely, as appropriate. In one embodiment where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. In one embodiment, the system and various devices include a number of software applications, modules, services, or other elements located within at least one working memory device, including an operating system and application programs, such as a client application or web browser. In one embodiment, customized hardware is used and/or particular elements are implemented in hardware, software (including portable software, such as applets), or both. In one embodiment, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, by a computing system, a digital video;
    detecting, by the computing system, a person recorded in the video;
    determining, by the computing system, a set of a plurality of different possible activities corresponding to a motion of the person recorded in the video; and
    using, by the computing system, the identity of an object to select one activity from the set of the plurality of possible activities as the identity of the motion of the person and to exclude the other activities of the plurality of different possible activities as being the identity of the motion of the person.

2. The computer-implemented method of claim 1, further comprising:
    detecting an interaction between the person and the object; and
    using the interaction to select the activity.

3. The computer-implemented method of claim 1, further comprising:
    detecting another object in the video; and
    using the identity of the other object to determine the set of activities.

4. The computer-implemented method of claim 1, wherein determining an activity is accomplished at least in part by:
    identifying a set of objects that are correlated with the set of activities;
    detecting whether each object in a set of objects is present in the video; and
    using the detection of each object in the set of objects to select the activity.

5. A computing system, comprising:
    one or more non-transitory machine-readable mediums having stored thereon a set of instructions, which if performed by one or more processors, cause the computing system to at least:
        obtain a video that includes one or more video segments, the one or more video segments including a segment of video;
        detect a first object in the segment of video; and
        determine an activity performed by the first object in the segment of video based at least in part on a second object in the segment of video, the activity determined from a set of a plurality of possible activities performed by the first object based at least in part on the identity of the second object, with the other activities of the plurality of possible activities being excluded as the identity of a motion of the first object based at least in part of the identity of the second object.

6. The computing system of claim 5, wherein the instructions further cause the computing system to:
    determine a set of objects that are correlated to the activity; and
    search the segment of video for presence of each object in the set of objects.

7. The computing system of claim 5, wherein:
    the absence of the second object is positively correlated with the activity; and
    the instructions cause the computing system to determine the activity at least in part by determining that the second object is not present in the segment of video.

8. The computing system of claim 5, wherein the instructions further cause the computing system to:
    determine a confidence level associated with the determining of the activity in the segment of video;
    adjust the confidence level based at least in part on having detected presence of the second object in the segment of video; and
    wherein presence of the second object is correlated with the activity.

9. The computing system of claim 8, wherein:
    the confidence level is decreased as a result of detecting presence of the second object; and
    the second object is negatively correlated with the activity.

10. The computing system of claim 5, wherein the instructions further cause the computing system to:
    acquire a video stream that includes a plurality of video segments, the plurality of video segments including the segment of video;
    identify a set of video segments from the plurality of video segments that contain a confirming object, the confirming object positively correlated with the activity; and
    search the set of video segments for presence of the activity.

11. The computing system of claim 5, wherein the activity is detected by at least:
   determining a set of possible activities performed by the first object;
   determining a set of objects that are correlated to a set of possible activities, the set of objects including the second object, and the set of activities including the activity; and
   selecting the activity from the set of possible activities based at least in part on presence or absence of each object in the set of objects in the segment of video.

12. The computing system of claim 5, wherein:
   the first object is a human subject; and
   the activity is determined at least in part by determining a relative position between the first object and the second object.

13. A non-transitory computer-readable storage medium having stored thereon executable instructions that, as a result of being executed by one or more processors of a computer system, cause the computer system to at least:
   acquire a video that includes one or more video segments, the one or more video segments including a segment of video;
   detect a first object in the segment of video; and
   determine an activity performed by the first object in the segment of video based at least in part on the identity of a second object in the segment of video, the activity determined from a set of a plurality of identified possible movement activities of the first object, with the other activities of the plurality of identified possible movement activities of the first object being excluded as the identity of the activity of the first object based at least in part of the identity of the second object.

14. The non-transitory computer-readable storage medium of claim 13, wherein the instructions further comprise instructions that, as a result of being executed by the one or more processors, cause the computer system to:
   identify the segment of video from a video stream; and
   identify the second object by analyzing an individual frame in the segment of video.

15. The non-transitory computer-readable storage medium of claim 13, wherein:
   the activity is an action performed by a human subject; and
   the human subject interacts with the second object.

16. The non-transitory computer-readable storage medium of claim 13, wherein the instructions that cause the computer system to:
   identify a set of objects that are correlated with the activity, the set of objects including the second object; and
   determine whether each object in the set of objects is present in the segment of video, without searching for presence of other objects.

17. The non-transitory computer-readable storage medium of claim 13, wherein the instructions further comprise instructions that, as a result of being executed by the one or more processors, cause the computer system to:
   determine that the activity is one of a class of activities; and
   identify another activity from the class of activities based at least in part on the presence of the second object.

18. The non-transitory computer-readable storage medium of claim 13, wherein the instructions further comprise instructions that, as a result of being executed by the one or more processors, cause the computer system to:
   determine a confidence level associated with detection of the activity in the segment of video; and
   adjust the confidence level based at least in part on having detected the absence of the second object in the segment of video; and
   wherein presence of the second object is correlated with the activity.

19. The non-transitory computer-readable storage medium of claim 18, wherein:
   the confidence level is decreased as a result of detecting the absence of the second object; and
   the absence of the second object is negatively correlated with the activity.

20. The non-transitory computer-readable storage medium of claim 18, wherein:
   the confidence level is increased as a result of detecting the absence of the second object; and
   the absence of the second object is positively correlated with the activity.

* * * * *